(12) United States Patent
Coblentz et al.

(10) Patent No.: US 8,065,741 B1
(45) Date of Patent: Nov. 22, 2011

(54) METHOD AND APPARATUS FOR LOCALLY CACHING DIGITAL RIGHTS INFORMATION

(75) Inventors: David S. Coblentz, San Jose, CA (US); James M. Wicker, San Jose, CA (US); Grant H. Williard, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1079 days.

(21) Appl. No.: 11/739,305

(22) Filed: Apr. 24, 2007

(51) Int. Cl.
*G06F 7/04* (2006.01)

(52) U.S. Cl. .......................................... 726/27

(58) Field of Classification Search .................. 380/257; 713/156; 726/26, 27
See application file for complete search history.

(56) References Cited

U.S. PATENT DOCUMENTS

| | | | |
|---|---|---|---|
| 7,036,011 | B2 | 4/2006 | Grimes et al. |
| 7,251,833 | B2 | 7/2007 | Feig et al. |
| 2001/0007997 | A1 | 7/2001 | Fujieda |
| 2002/0082997 | A1* | 6/2002 | Kobata et al. ............ 705/51 |
| 2002/0146236 | A1 | 10/2002 | Kauffman et al. |
| 2003/0163724 | A1 | 8/2003 | Tayebi et al. |
| 2003/0217011 | A1 | 11/2003 | Peinado et al. |
| 2003/0217275 | A1 | 11/2003 | Bentley et al. |
| 2004/0015948 | A1 | 1/2004 | Sueyoshi et al. |
| 2006/0041840 | A1 | 2/2006 | Blair et al. |
| 2007/0174281 | A1* | 7/2007 | Chase ........................ 707/9 |
| 2007/0219923 | A1 | 9/2007 | Shea et al. |
| 2007/0294773 | A1 | 12/2007 | Hydrie et al. |

FOREIGN PATENT DOCUMENTS

| | | |
|---|---|---|
| JP | 2002-244756 | 8/2002 |
| JP | 2003-330560 | 11/2003 |
| JP | 2006-048687 | 2/2006 |

OTHER PUBLICATIONS

U.S. Appl. No. 11/609,766, filed Dec. 12, 2006.
Office Action from U.S. Appl. No. 11/609,766 mailed Mar. 4, 2010, 10 pages.
Office Action from U.S. Appl. No. 11/609,766 mailed Aug. 26, 2010, 21 pages.
Adobe LiveCycle Policy Server (Datasheet, (c) 2006 Adobe Systems Incorporated, Jun. 2006.

(Continued)

*Primary Examiner* — Ellen Tran
(74) *Attorney, Agent, or Firm* — Robert C. Kowert; Meyertons, Hood, Kivlin, Kowert & Goetzel, P.C.

(57) ABSTRACT

Method and apparatus for locally caching rights management information for objects and operations in user sessions. A rights caching component may be implemented in network-based computer environments for which digital rights management (DRM) is applied to large collections of objects, such as Computer-Aided Design (CAD) environments. DRM information may be stored and managed by a rights management server. A rights caching component on a workstation may create and manage a local cache of a subset of the DRM information for objects that may be used in a session. Determining the appropriate rights for operations and objects during the session may be performed by accessing the local cache of DRM information. The local cache of DRM information may be encrypted or otherwise protected. The rights caching component may periodically or aperiodically synchronize the local cache of DRM information with the DRM information managed by the rights management server.

38 Claims, 5 Drawing Sheets

OTHER PUBLICATIONS

Navisware E-DRM Buy Could Give Adobe a One-Stop-Shopping Solucation, Gartner RAS Core Research Note, G00137398, Ray Wagner, Toby Bell, Eric Ouellet, Jan. 19, 2006, R1691 08122006.

Acquisition to extend capabilities of Adobe LiveCycle Policy Server, (c) 2006 Adobe Systems Incorporated, Feb. 2006.

U.S. Search Report for PCT/US2007/087261 mailed May 28, 2008.

House, et al., "Special Edition Using AutoCAD 2000," (2) 2000 Que Publishing Inc. Excert from Chapter 1 (26 pages).

OwnerGuard (Version 2.5.3) (c)2006 Armjisoft, (Publication date of Oct. 26, 2006 verified by the Internet Archive) (3 pages) http://web/archive.org/web/20061026101334/http://armjisoft.com/?page=autocadownerguard.

Burchard, Bill, et al., "Inside AutoCAD(R) 2000 Limited Edition," (c)1999 New Riders Publishing, Excerpts from Chapters 1, 9-11, 23, 26 and Appendix C (pp. 2-18, 163-235, 428-445, 505-511, and 782.

"Pinion Software CEO to Present at Aerospace Design Expo, 'Protecting the Engineering . . . " Publishd Aug. 29, 2006 by BusinessWire http://www.allbusiness.com/technology/software-services-applications-information/5435385-1.html.

"Technical Rights Management," Published Mar. 19, 2006 as verified by the Internet Archive (2 pages) http://web.archive.org/web/20060319024425/www.pinionsoftware.com/docs/technicalRightsManagement.pdf.

"Pinion Software: Solutions / Secured CAD Files" Published Dec. 26, 2005 as verified by the Internet Archive (1 page) http://web.archive.org/web/20051226045053/www.pinionsoftware.com/solutions-secure-cad-filed.php.

"Pinion Software and Autodesk Partner to Improve the Security of Technical Data" Published Nov. 28, 2005 (2 pages) http://web.archive.org/web/20051210031343/www.pinionsoftware.com/docs/Pinion-Software-Autodesk-DWF-release.pdf.

"Pinion Software Protects Your Rights," Published Dec. 26, 2005 as verified by the Internet Archive (3 pages) http://web.archive.org/web/20051226033702/www.pinionsoftware.com/TRM.php.

OwnerGuard (Version 2.5.3) (c)2006 Armjisoft, (Publication date of Oct. 26, 2006 verified by the Internet Archive) (3 pages).

"Pinion Software: Solutions / Secured CAD Files" Published Dec. 26, 2005 as verified by the Internet Archive (1 page).

"Technical Rights Management," Published Mar. 19, 2006 as verified by the Internet Archive (2 pages).

* cited by examiner

METHOD AND APPARATUS FOR LOCALLY CACHING DIGITAL RIGHTS INFORMATION

BACKGROUND

1. Field of the Invention

This invention relates to computer systems, and more specifically to the digital rights management of collections of objects such as CAD assemblies.

2. Description of the Related Art

In network-based computer environments, large collections of objects (e.g., files) may be stored and managed by server(s) on behalf of multiple users that may access objects in the collections remotely via workstations. In many such environments, digital rights of the objects in the collections may be managed via one or more servers, which may be, but are not necessarily, the server(s) that store and manage the collections of objects. When a user on a workstation initiates an operation that involves one or more objects in the collections, digital rights information related to the operation, user, and object(s) may be remotely accessed via the network from one or more of the server(s) that manage the digital rights for the collection. If such an operation happens to involve many such rights-managed objects, many separate accesses to the server(s) may be generated to access the digital rights information for the objects.

Network-based Computer-Aided Design (CAD) systems are exemplary of a network-based computer environment in which digital rights management (DRM) of large collections of objects may be implemented. CAD systems may be used by architects, engineers, drafters, artists, and others to create precision drawings or technical illustrations. CAD software (referred to herein as CAD applications) may be used to create two-dimensional (2-D) drawings or three-dimensional (3-D) models. Closely related CAD/CAM (computer-aided design/computer-aided manufacturing) is software used to design products such as electronic circuit boards in computers and other devices. CAD systems may range from low-end systems intended for personal use that may be implemented and executed as a CAD application on a personal computer to high-end, network-implemented systems, department-wide or possibly even enterprise-wide systems, with multiple high-end CAD workstations, CAD file servers, high-end printers, and possibly other infrastructure and components, and on which collections of CAD objects may be accessed by or shared among various users in the enterprise or possibly even accessed by or distributed to others outside the enterprise.

SUMMARY

Various embodiments of a method and apparatus for locally caching rights management information for objects and operations in user sessions are described. Embodiments may provide a rights caching component or module that may be implemented in network-based computer environments for which digital rights management (DRM) is applied to large collections of objects. In a digital rights-managed computer environment, digital rights management (DRM) information for objects and users may be stored and managed by a rights management server. A rights caching component instance on a workstation may create and manage a local cache of a subset of the DRM information stored and managed by the server for objects that may be used in a session. Determining the appropriate rights for operations and objects during the session may then be performed by locally accessing the local cache of DRM information rather than by remotely accessing the rights management server. The local cache of DRM information may be encrypted or otherwise protected. The rights caching component may periodically or aperiodically synchronize the local cache of DRM information with the DRM information stored and managed by the rights management server.

Embodiments of the rights caching component overcome the problem of working with large data sets by obtaining and locally caching digital rights information, and then accessing the local cache of digital rights information to determine rights associated with operations such as attempts to open files, rather than making a separate remote call to a server to determine rights for each separate object (e.g., file) effected by the operation.

Computer-Aided Design (CAD) systems are an example of a network-based computer environment in which embodiments may be implemented. An aspect of the rights caching component is that the module locally caches the rights management information for a user in a session, thus enabling rights management of objects in CAD assemblies during CAD sessions by accessing the rights management information from the local cache rather than remotely over a network. By accessing the rights management information from the local cache rather than remotely over a network, embodiments of the rights caching component may improve the performance of CAD systems in general and performance during CAD sessions in particular. Further, locally caching rights management information on a CAD station for a CAD session initiated by a particular user may allow the user to work offline. That is, the CAD station, during a CAD session and after the local cache of digital rights information has been generated, may be disconnected from the network on which the CAD system including the rights management server is implemented, and the user may continue to initiate operations on available CAD objects via the CAD application on the CAD station. The rights caching component acts to determine and enforce digital rights for operations initiated by the user while the CAD station is offline via accesses to the local cache of digital rights information for the CAD session.

In one embodiment, implemented in a networked CAD system, one or more rights management servers may store and manage rights information for CAD objects, which are typically stored and managed in CAD files on one or more CAD file servers, rights information for the CAD files themselves, and rights information for CAD users. Each CAD station in the networked CAD system may host at least one instance of the rights caching component. A user may initiate a CAD session on a CAD station. The user's rights information may be obtained from the rights management server. A local cache of the obtained rights information for the user may be generated or synchronized using the obtained information. In one embodiment, the local cache of digital rights information may be encrypted or otherwise protected. The user may initiate an operation in the CAD session. The local cache of the user's right information may be accessed to determine the relevant rights associated with the operation and/or CAD objects for the particular user. The operation may be allowed or disallowed in accordance with the rights of the particular user for the operation and the CAD objects as determined from the local cache of the user's rights information.

Figure 1:
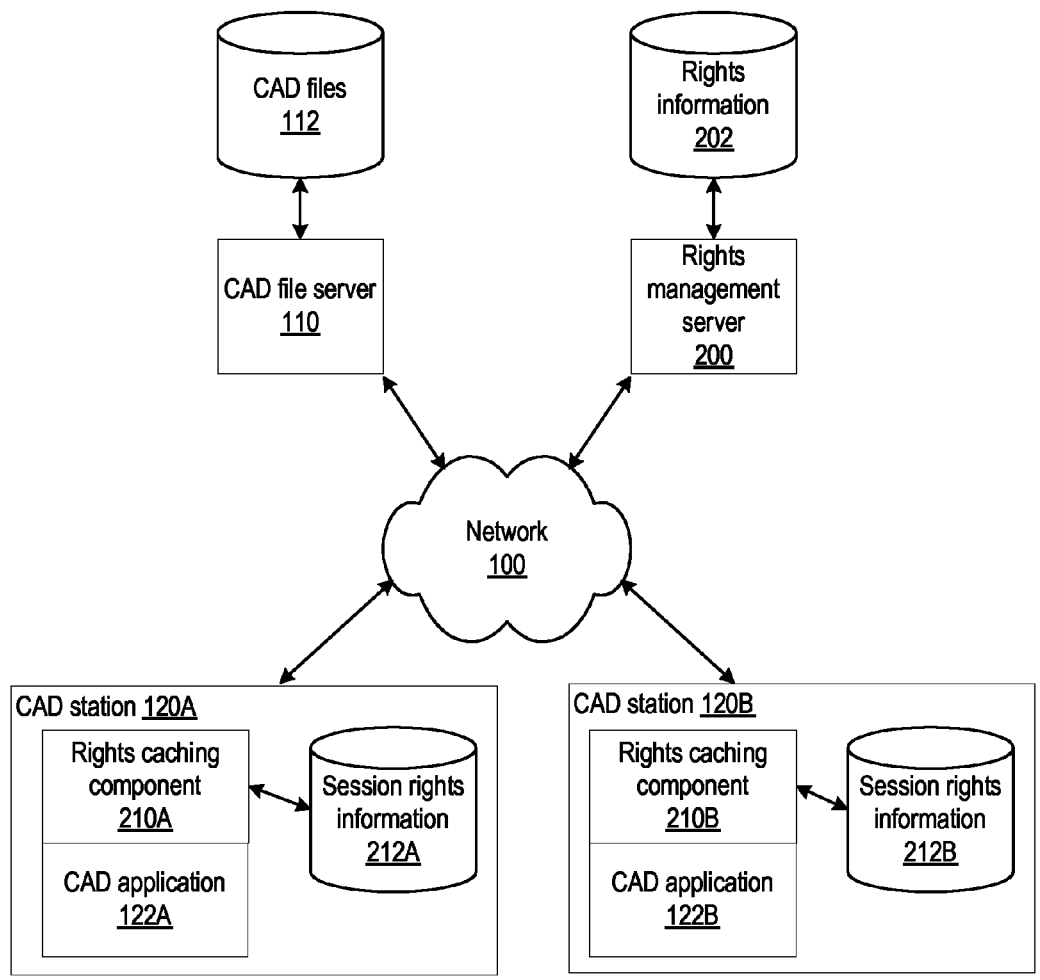
FIG. 1 illustrates an exemplary CAD system implemented on a network and including instances of rights caching component on CAD workstations according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for locally caching rights management information for objects and operations in user sessions are described. Embodiments may provide a rights caching component or module that may be implemented in network-based computer environments for which digital rights management (DRM) is applied to large collections of objects. For example, embodiments may be implemented in and/or integrated with Computer-Aided Design (CAD) systems, including network-based CAD systems. In such a digital rights-managed computer environment, digital rights management (DRM) information for objects and users may be stored and managed by a rights management server. A rights caching component instance on a workstation may create and manage a local cache of a subset of the DRM information stored and managed by the server for objects that may be used in a session. The local cache of DRM information may be encrypted or otherwise protected. The rights caching component may periodically or aperiodically synchronize the local cache of DRM information with the DRM information stored and managed by the rights management server. Operations that require DRM information for objects during the session may then be directed to the local cache of DRM information by the rights caching component rather than to the rights management server. Thus, network access of the rights management server during a session may be reduced, which may improve performance and response time.

Online (network-based) methods of enforcing DRM may be problematic for large collections of data. For example, online methods of enforcing DRM when accessing collections DRM protected files do not scale well if there are many files that must be opened as part of one operation. When accessing large collections of files, it may be necessary for a user to open many files at once. A network-based DRM enforcement method may require a separate network access to verify the rights of the user associated with each file to determine if the file can or cannot be opened by the user. For example, a user of a CAD system may attempt to open a CAD assembly. Opening a CAD assembly may require the opening of hundreds if not thousands of files related to the assembly. As an example of the type of performance problems this may cause, for a data set that includes 3000 individual files, a network latency of ½ second per message to obtain digital rights information for each file would result in an additional 25 minutes to open the entire data set. Embodiments of the rights caching component overcome the problem of working with large data sets by obtaining and locally caching digital rights information, and then accessing the local cache of digital rights information to determine rights associated with operations such as attempts to open files, rather than making a separate remote call to a server to determine rights for each separate object (e.g., file) effected by the operation.

CAD systems are provided as an example of a network-based computer environment in which embodiments may be implemented. In many CAD systems, including but not limited to CAD systems that enable three-dimensional (3-D) CAD, it may be necessary or desired to establish, manage, and enforce digital rights management for CAD objects, or parts, within a structured CAD assembly or assemblies during CAD sessions. CAD objects may include, but are not limited to, CAD files, including but not limited to CAD assembly, family, and part files, and the objects instantiated from those files, e.g. the assemblies and parts instantiated in a geometric relationship in accordance with binding information into a viewable, structured CAD model, or CAD assembly, in a CAD session. "CAD model" may be referred to herein as "CAD assembly". Particularly in 3-D CAD environments, there may be many, even thousands, of components (parts) of CAD assemblies that need to be rights managed in a CAD session. In a CAD environment, digital rights information for various CAD users, objects, assemblies, files parts, and so on may typically be remotely stored and accessed via a server, for example a rights management server. Accessing the digital rights information during a session may thus, in a conventional CAD environment, require an access to the remotely stored digital rights information via the server for each individual access of a digitally rights-managed object or part in the CAD session. A single CAD session could easily generate thousands of such accesses, which each take time, network bandwidth, and server resources. In some cases, a user may be forced to wait for considerable periods, for example after opening an assembly containing thousands of parts, for all of the digital rights for the assembly in regards to the user to be verified remotely via the rights management server. With the possibility of multiple concurrent CAD sessions in a CAD environment, the bandwidth, time and resource usage may be multiplied to the point where performance of the overall CAD (and network) system is negatively affected.

An aspect of the rights caching component is that the module locally caches the rights management information for a user in a session, thus enabling rights management of objects in CAD assemblies during CAD sessions by accessing the rights management information from the local cache rather than remotely over a network. Embodiments of the rights caching component may manage and enforce digital rights at all levels during a CAD session, including the atomic object level, and at the different levels or tiers of the hierarchy of parts in CAD assemblies. By accessing the rights management information from the local cache rather than remotely over a network, embodiments of the rights caching component may improve the performance of CAD systems in general and performance during CAD sessions in particular.

Locally caching rights management information on a CAD station for a CAD session initiated by a particular user may allow the user to work offline. That is, the CAD station, during a CAD session and after the local cache of digital rights information has been generated, may be disconnected from the network on which the CAD system including the rights management server is implemented, and the user may continue to initiate operations on available CAD objects via the CAD application on the CAD station. The rights caching component acts to determine and enforce digital rights for operations initiated by the user while the CAD station is offline via accesses to the local cache of digital rights information for the CAD session. Some operations, such as synchronization of the local cache of rights information with the rights information managed by a rights management server, may not work while offline.

Embodiments of the rights caching component may locally cache digital rights information for a user in a CAD session and then apply rights management in the context of structured CAD assemblies during the CAD session via accessing the locally cached rights information. In a structured CAD assembly, the CAD model is broken up into a number of objects (parts) in a hierarchical or other structured way. For example, a house consists of a roof, doors, windows, etc. In a CAD model, the house may be considered the assembly, and each of the components of the house may be represented as a part. As noted, there is a hierarchical arrangement of parts in a structured CAD assembly. For example, in a CAD model of a house, a high level part may be a room. Going farther down the hierarchy, a next-level part may be a kitchen. The kitchen may include parts that include a sink, counters, cabinets, etc. The relationship among those parts is referred to as binding information. Each of those parts may be individually assigned digital rights. Further, each user may be assigned digital rights in relation to CAD files, assemblies and parts. The rights caching component may provide rights management information for assemblies and individually for each part by locally caching the rights management information for a user in a CAD session and then locally accessing the cached rights management information, rather than accessing the rights management information for each object individually via a rights management server over a network.

Embodiments may include, but are not limited to, a rights management server and a rights caching component that may be instantiated on one or more CAD stations (which may be considered clients of the rights management server). In one embodiment, implemented in a networked CAD system, one or more rights management servers may store and manage rights information for CAD objects, which are typically stored and managed in CAD files on one or more CAD file servers, rights information for the CAD files themselves, and rights information for CAD users. Each CAD station in the networked CAD system may host at least one instance of the rights caching component. In one embodiment, the rights caching component may be implemented as a plug-in to CAD application software on each CAD station. Implementing the rights caching component as a plug-in allows the rights caching component to be adapted to function with ("plug in to") a variety of CAD application software from a variety of vendors. Alternatively, the rights caching component may be implemented as a module or component of the CAD application software, rather than as a separate module or plug-in, or as a stand-alone program.

A CAD environment that implements digital rights management may also include one or more stations or consoles from which an administrator or administrators may perform various administrative functions, which may include, but are not limited to defining and modifying the rights, policies, and rules that are to be enforced in the CAD environment. For example, if a new CAD user is added to the CAD system, an administrator may define the rights to be granted to the new user; these user rights may be stored and managed by the rights management server. Rights information that may be needed by a particular user during a CAD session on a CAD station may be locally cached on the CAD station for the CAD session by the rights caching component. Actions of the user during the CAD session, for example access of a CAD assembly or parts thereof during the CAD session, that require the application of digital rights management during the CAD session can then be rights managed via access of the locally cached digital rights information, rather than via multiple network accesses of the rights management server.

While embodiments are described herein in regards to providing rights management in CAD systems by locally caching digital rights information for CAD sessions, embodiments may be adapted to provide local caching of rights management information in other types of systems.

FIG. 1 illustrates an exemplary CAD system implemented on a network and including instances of rights caching component on CAD workstations according to one embodiment. One or more CAD stations 120, each implementing CAD software as a CAD application 122, may be coupled to a network 100. A CAD file server 110 may be coupled to network 100. CAD file server 110 may store and manage CAD files 112. CAD files 112 may include, but are not limited to, assembly files, part files, and family files.

CAD system software and/or hardware, including CAD stations 120 and CAD applications 122, may be, but are not necessarily, heterogeneous. That is, the CAD system software and/or hardware may be composed of components from one vendor, and the CAD applications 122 may be instances of a particular CAD application from the vendor. Alternatively, a CAD system may include homogeneous hardware and/or software. That is, the CAD system software and/or hardware may be composed of components from two or more vendors. For example, the CAD applications 122 may include instances of CAD applications from different vendors and/or of different versions or types of CAD applications from one vendor. Further note that CAD stations 120 may be high-end CAD workstations designed specifically for CAD, or alternatively may be more generic computer systems capable of hosting and running CAD applications 122. The CAD stations 120 in a CAD system may include a mix of different types of computer devices or workstations from one or more vendors that host CAD applications 122.

Further, different users may work on different CAD stations 120. Each user may have an account or accounts, possibly password-protected or otherwise protected accounts, which enable the user to log into a CAD station 120 and to use the CAD application 122 thereon to participate in the CAD system. A user of a CAD application 122 on a CAD station 120 may access CAD files 112 via CAD file server 110. For example, a user may access a particular CAD assembly file to render and display the CAD assembly on a CAD station 120A. The CAD application 122A and CAD station 120A may provide different user interface elements and tools that may enable the user to manipulate or modify the displayed CAD assembly, print the CAD assembly, and so on.

An implementation in a networked CAD system may include, but is not limited to, at least one rights management server 200 and one or more rights caching components 210. Rights management server 200 may store and manage rights information 202. Rights information 202 may include one or more of, but is not limited to, rights information for CAD objects, rights information for the CAD files 112, and rights information for CAD users. Each CAD station 120 in the networked CAD system may host an instance of the rights caching component 210. In one embodiment, the rights caching component 210 may be implemented as a plug-in to CAD application 122 on each CAD station 120. Alternatively, the rights caching component 210 may be implemented as a module or component of the CAD application 122 software, or as a stand-alone program.

Instances of the rights caching component 210 on each CAD station 210 in the CAD system, or alternatively on at least one CAD station 210 in the CAD system, may be used to locally cache rights management information 212 for CAD objects for specific user sessions. Session rights information 212A and 212B represent locally cached rights management information on CAD station 210A and 210B, respectively. When a user accesses or logs on to a CAD application 122 on a particular CAD station 210, a CAD session is initiated for that user. In a CAD system, two or more users on different CAD stations 120 may access the same or different CAD assembly and/or same or different CAD parts to render, display, and possibly perform various other operations on the assemblies and parts. Each different user is associated with a particular CAD session on the particular CAD station 120 on which the user is working. Session rights information 212 specific to the user that initiated the CAD session may be locally cached by the rights caching component 210 on the station for each such CAD session.

In a CAD environment, each user may be assigned user-specific rights for each specific CAD operation at the CAD assembly and/or CAD part level. In addition, user-specific rights may be assigned for particular assemblies, parts or files. These user-specific rights may be stored in rights information 202 and managed by one or more rights management servers 200. In one embodiment, it is these user rights specific to a particular user associated with a CAD session that are locally cached by rights caching component 210 for the CAD session initiated by the particular user.

As an example of user rights and how they may vary among users, one user may have rights to display and print a particular part of an assembly, while another user may have the right to display but not to print the particular part. As another example, one user may be granted global rights that allow the user to access and perform any CAD operation on any assembly or part in the CAD system, while another user may be granted limited rights that only allow the user to display and view the assemblies. As another example, a particular user may be granted rights that allow the user to access and perform any CAD operation on a subset of the assemblies and/or parts, but the user may have limited rights to access and/or perform CAD operations on the rest of the assemblies and/or parts. As another example, a particular user may be granted rights to access, render, display, manipulate, and even modify a particular assembly, including the parts in the assembly, but may not have rights to perform at least some CAD operations on one or more specific parts of the assembly. For a particular user, at least a portion of and perhaps all of this rights information may be locally cached in session rights information 212 for a CAD session initiated by the particular user.

While rights are generally described herein as being assigned and managed for users and for CAD assemblies and parts, in one embodiment, rights may be assigned to or associated with particular CAD stations 120 and/or particular instances of CAD application 122. In other words, particular rights may be associated with a particular CAD station 120 or CAD application 122, and specific CAD operations may be denied or allowed on some or all CAD assemblies and/or parts to any user of that CAD station 120 or application 122. Thus, in one embodiment, CAD application 122 and/or CAD station 120 rights may be locally cached in session rights information 212.

In one embodiment, a user may initiate a CAD session on a CAD station 120. At some point during or after the initiation of the CAD session, the local instance of rights caching component 210 may obtain or determine identifying information for the user (e.g., a user name, user identifier, and/or user password). Rights caching component 210 may then communicate with rights management server 200 to obtain digital rights information for the user from rights information 202. The obtained digital rights information may, but does not necessarily, include all digital rights information for the user that initiated the CAD session, and thus may, but does not necessarily, include all digital rights information that may be required during the CAD session. The obtained digital rights information may then be locally cached by rights caching component 210 as session rights information 212. In one embodiment, session rights information 212 may be encrypted or otherwise protected so that the session rights information 212 may be securely accessed by the rights caching component 210 while also being protected from intentional or unintentional access or modification by the user that initiated the session or by other individuals or software programs.

In one embodiment, a single message may be sent by rights caching component 210 to rights management server 200 to obtain digital rights information for the user at the initiation of a CAD session. One or more messages may then be returned by the rights management server 200 to the rights caching component 210 that include the requested digital rights information. Thus, in one embodiment, digital rights information for an entire CAD session may require only one message to be sent remotely over the network to rights management server 200. In other embodiments, more than one message may be sent by rights caching component 210 to rights management server 200 to obtain digital rights information for the user. In either case, the number of messages that are sent to rights management server 200 during a CAD session may be reduced, as after locally caching session rights information 212 for the CAD session, operations during the CAD session that require digital rights may be locally satisfied by accessing the local cache of session rights information 212 rather than remotely accessing rights information 202 via rights management server 212.

After locally caching session rights information 212 on a CAD station 120 for a user that initiates a CAD session on the station 120, rights caching component 210 may locally manage digital rights for CAD objects (e.g., CAD assemblies, parts in a CAD assembly, etc.) during the CAD session using the locally cached session rights information 212. During the CAD session, various operations for which rights management is to be applied may be initiated by the user interacting with the CAD application 122 user interface. In one embodiment, the rights caching component 210 may intercept or otherwise access an initiated operation on the CAD station 120, and in response to the initiated operation act to apply the proper rights management in accordance with the digital rights of the particular user associated with the CAD session locally cached in session rights information 212. In one embodiment, as an alternative to the rights caching component 210 intercepting or otherwise accessing initiated operations and then accessing session rights information 212 to determine the relevant rights for the operation, CAD application 122 may be configured to directly access the session rights information 212 to determine the relevant rights for the operation.

As an example, a user interacting with the CAD application 122 user interface during a CAD session may attempt to open a CAD assembly. The CAD assembly may include many parts. CAD file server 110 may manage a collection of CAD files 112. CAD files 112 may include an assembly file for the CAD assembly and a parts file for each part of the CAD assembly. Rights caching component 210 may intercept or otherwise access the initiated "open assembly" operation on the CAD station 120, and in response to the initiated operation act to apply the proper rights management at all levels of the CAD assembly, including the atomic object level of the CAD assembly, in accordance with the digital rights of the user locally cached in session rights information 212 for the CAD session. Rather than messaging the rights management server 200 to determine the user's rights in regards to the CAD assembly and each of the parts of the CAD assembly from rights information 202, which may require a separate message to be sent to the rights management server 200 over network 100 for each object associated with the CAD assembly, rights caching component 210 accesses locally cached session rights information 212 to obtain the user's rights in regards to the objects associated with the CAD assembly. Once the user's rights in regards to the objects associated with the CAD assembly are obtained from session rights information 212, the files related to the objects may be accessed from CAD files 112 via CAD file server 210 if the obtained rights indicate that the user may access the files.

In one embodiment, rights caching component 210 may not obtain the user's rights in regards to all of the objects associated with a CAD assembly from session rights information 212 directly in response to the user's initiation of an "open assembly" operation. Instead, rights caching component 210 may obtain the user's rights in regards to the assembly file and, if the user has "open" rights to the assembly file, may then obtain the assembly file. The assembly file may include indications of CAD objects and/or files that are associated with the CAD assembly. As the CAD assembly is being instantiated in the CAD session from the assembly file, digital rights of the user in relation to objects and/or files associated with the CAD assembly that are necessary to instantiate and display the CAD assembly in the CAD session may be accessed from the session rights information 212 via the rights caching component 210. After the CAD assembly is instantiated in the session, further user interactions with the CAD application 122 in the CAD session may be performed to initiate various operations on the CAD assembly. In response to each such initiated operation, rights caching component 210 may act to apply the proper rights management for all objects of the CAD assembly affected by the operation in accordance with the digital rights of the particular user associated with the CAD session locally cached in session rights information 212. Applying rights management may include, but is not limited to, allowing or disallowing the operation for some or all of the objects affected by the operation.

In one embodiment, if an operation may affect multiple objects (e.g., multiple parts of a CAD assembly), the operation may be allowed for all the objects, disallowed for all the objects, or allowed for a portion of the objects and disallowed for the rest of the objects. For example, an initiated operation may be a print operation to print the CAD assembly or a portion thereof. The rights information obtained by rights caching component 212 from the local cache of session rights information 212 may indicate that the particular user has the appropriate rights to print the CAD assembly but does not have the rights to print one or more of the parts included in the assembly. The CAD assembly may then be printed to an indicated printer, but the one or more parts that the user does not have the rights to print are not printed.

In some cases, rights caching component 210 may determine that rights information for an object or objects in a CAD assembly that are required in response to the initiation of an operation are not locally cached in session rights information 212. In some cases, rights caching component 210 may determine that the user's rights in regards to some object or objects in a CAD assembly do not allow the user to access the object(s) offline, and thus the local cache of session rights information 212 cannot be used to determine the user's rights in regards to the object(s). In these cases, and possibly in other cases, rights caching component 210 may attempt to communicate with rights management server 200 via network 100 to obtain the rights information from rights information 202. If successful, the obtained rights may then be used to apply proper rights management for the operation on the associated objects. The obtained rights information may be added to or updated in the local cache in session rights information 212.

Remotely stored rights information 202 for a CAD system may be modified or updated, even during the time a CAD session is open. For example, an administrator may change a user's digital rights in regards to a CAD assembly, part, or file. In one embodiment, during a CAD session, rights caching component 210 may periodically or aperiodically synchronize session rights information 212 with rights information 202 via rights management server 200 to insure that the user's locally cached digital rights are current. In one embodiment, the synchronization may be event-driven. For example, some operations, such as opening a CAD assembly, closing or saving a CAD assembly, or printing a CAD assembly may initiate a synchronization of session rights information 212 with rights information 202. In one embodiment, CAD application 122 may include one or more user interface elements, such as a menu selection or button on a toolbar or other user interface, that allow the user to initiate a synchronization of session rights information 212 with rights information 202 as necessary or desired.

In one embodiment, session rights information 212 may be maintained only for the lifetime of the current CAD session associated with the session rights information 212. In other words, the session rights information 212 for a CAD session may be deleted when the CAD session ends, and a new session rights information 212 may be generated for each subsequent CAD session. In another embodiment, session rights information 212 for a user may be persisted across two or more CAD sessions initiated by the user. In this embodiment, when a user initiates a new CAD session, rights caching component 210 may check to see if a local cache of session rights information 212 for the user is on the CAD station 120. If session rights information 212 for the user exists, then rights caching component 210 may use the existing session rights information 212 rather than creating a new instance of session rights information 212. Rights caching component 210 may synchronize the existing session rights information 212 with rights information 202 at or after the initiation of the CAD session, if necessary or desired, or alternatively may wait to synchronize until an event occurs that requires or may require synchronization.

In some CAD systems, at least some operations and events that occur within a CAD session may be logged by the CAD system for security, historical, tracking, or other purposes. In one embodiment, rather than registering each logged event remotely over the network to a server such as rights management server 200, a CAD session log may be maintained in session rights information 212. The CAD session log may then be protected via encryption or other methods along with the user's digital rights information. In one embodiment, synchronization of session rights information 212 with rights information 202 may include uploading the CAD session log to rights management server 200. Alternatively, the CAD session log may be uploaded to rights management server 200 in a separate operation, for example upon termination of the CAD session, and/or to a different server, such as to an administrative server.

Figure 2:
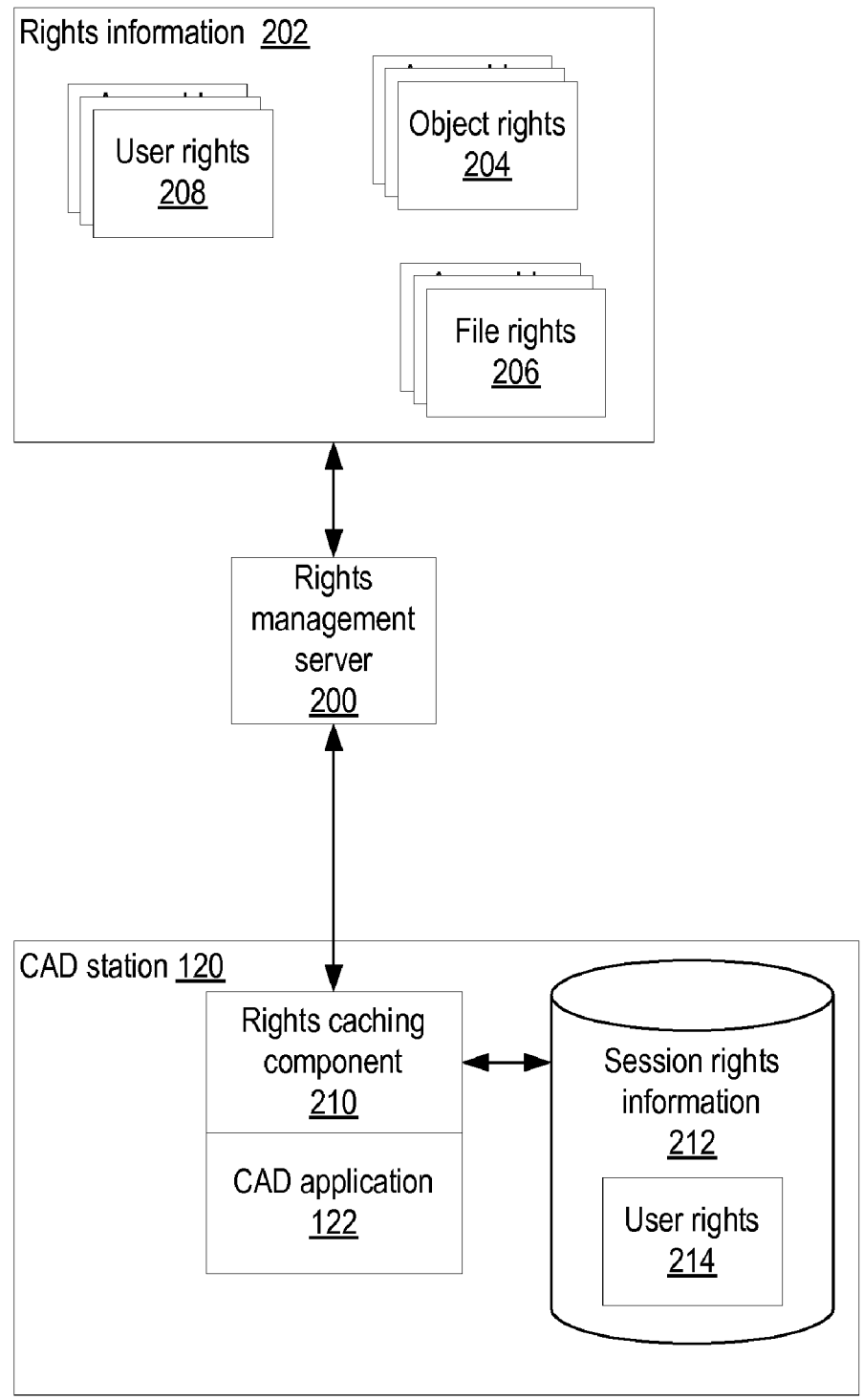
FIG. 2 illustrates the components of an exemplary rights management system including a rights caching component that may be implemented in a CAD system according to one embodiment.

FIG. 2 illustrates the components of an exemplary rights management system including a rights caching component that may be implemented in a CAD system according to one embodiment. An implementation of a rights management system may include, but is not limited to, at least one rights management server 200, rights information 202, and one or more rights caching components 210. Rights management server 200 may store and manage rights information 202. Rights information 202 may include one or more of, but is not limited to, rights information for CAD objects (object rights 204), rights information for CAD files (file rights 206), and rights information for CAD users (user rights 208). Note that the rights information as indicated for the objects and/or files may be specific to particular CAD operations for particular users.

The rights information 202 may be stored and managed using any of a variety of methods, or combination of two or more thereof, for storing and associating information. Note that the rights information 202 may be viewed as a definition of a rights policy for the CAD system that is stored and managed by the rights management server 200 and cached and enforced at the CAD station level at least in part by the rights caching component 210. Further note that, while FIG. 2 shows the object rights 204, file rights 206, and user rights 208 as separate elements, in various embodiment, the rights information may be stored and managed in one or more data structures. Further note that, in some embodiments, other rights may be defined in rights information 202. For example, in one embodiment, rights information 202 may define rights at the CAD station level that allow or restrict specific operations from being performed on particular CAD stations, or even by particular users at particular CAD stations. In the latter case, for example, rights information 202 may define a policy whereby a particular user may perform some operations on CAD objects on a particular CAD station but not on other CAD stations.

Rights information 202 may be organized so that policies may be established, managed, retrieved, and enforced for specific users performing specific operations on specific CAD files, assemblies and parts in CAD sessions. Thus, rights information 202 may define what operations particular users may or may not perform on particular files, parts, and/or assemblies in a CAD session. An alternative way to view rights information 202 is that rights information 202 may define which users may or may not perform which operations on which CAD objects in a CAD session. The following provides an exemplary and high-level view of how digital rights information may be organized in rights information 202. Note that this is exemplary, and is not intended to be limiting.

In one embodiment, rights information 202 may include, but is not limited to, something conceptually like the following that defines "global" rights for particular users:

<User 1>
Rights: access any, modify any, print any, copy any, delete any, . . . .

<User 2>
Rights: access any, modify by permission, print any, copy by permission, no delete, . . . .
<User 3>
Rights: access by permission, no modify, print by permission, copy by permission, no delete, . . . .
. . .
<User n>
Rights: . . . .

"By permission" in the above may refer to whether the rights information for the object in question (e.g., an assembly or part) indicates that the particular user may or may not perform the particular operation on the object. For example, if a user's rights indicate "access by permission", the user may only be able to open an assembly file to render and display an assembly on a CAD station if the assembly file's associated file rights 206 indicate that the user has permission to open the file. Continuing with the example, if the user's rights indicate "print by permission", the user may only be able to print the assembly if the assembly's associated object rights 204 indicate that the user has permission to print the assembly. Continuing with the example, if the user's rights indicate "print by permission", the user may be able to print the assembly if the assembly's associated rights information grants the user rights to print the assembly. However, the user may not be able to print one or more parts of the assembly if the parts' associated object rights 204 indicate that the user does not have permission to print the one or more parts.

In one embodiment, rights information 202 may include, but is not limited to, something conceptually like the following that defines rights for particular users in regards to particular objects, for example assemblies and parts:

<Assembly 1>
<User 1> rights: display, modify, print, copy, delete, . . . .
<User 2> rights: display, print
<User 3> rights: none
<User 4> rights: display, print, copy
. . .
<Assembly 2>
<User 1> rights: display, modify, print, copy, delete, . . . .
<User 2> rights: display, modify, print, copy
<User 3> rights: none
<User 4> rights: display, print
. . .
<Part 1>
<User 1> rights: display modify, print, copy, delete, . . . .
<User 2> rights: display modify, print
<User 3> rights: display, print, copy
<User 4> rights: display
. . .
<Part 2>
<User 1> rights: display, modify, print, copy, delete, . . . .
<User 2> rights: display, modify, print, copy
<User 3> rights: none
<User 4> rights: display, print
. . .
. . .

The above is exemplary of what rights information 202 may include and how rights information may be organized, and is not intended to be limiting. Other rights may be included, and other methods of organizing the rights information may be used.

In addition to a CAD system including at least one instance of a rights management server 200 and rights information 202, each CAD station 120 in a CAD system may host at least one instance of rights caching component 210. In one embodiment, the rights caching component 210 may be implemented as a plug-in to a CAD application on each CAD station 120. Alternatively, the rights caching component 210 may be implemented as a module or component of the CAD application 122 software on a CAD station 120, or as a stand-alone program.

Instances of the rights caching component 210 may create and manage local caches of session rights information 212 for CAD sessions that include user rights 214 specific to particular users associated with the CAD sessions on CAD stations 120, and may then access the local cache of user rights 214 to apply the proper rights management for CAD objects affected by operations initiated during the CAD session in accordance with the digital rights of the particular user associated with the CAD session. In one embodiment, to create a local cache of user rights 214 specific to a particular user, the rights caching component 210 may send a request message to the rights management server 200. The message may identify the particular user and request all rights corresponding to the user. The rights management server 200 may then respond by returning the particular user's rights in one or more response messages. Rights caching component 210 may then cache the returned rights in session rights information 212. In one embodiment, session rights information 212 may be encrypted or otherwise protected so that the session rights information 212 may be securely accessed by the rights caching component 210 while also being protected from intentional or unintentional access or modification by the user that initiated the session or by other individuals or software programs.

The following provides an exemplary and high-level view of how digital rights information for a particular user may be organized in session rights information 212. User 2 is provided as an example:

<User 2>
Rights: access any, modify by permission, print any, copy by permission, no delete, . . . .
<Assembly 1>
<User 2> rights: display, print
<Assembly 2>
<User 2> rights: display, modify, print, copy
<Part 1>
<User 2> rights: display modify, print
<Part 2>
<User 2> rights: display, modify, print, copy
. . .

The above is exemplary of what session rights information 212 may include for a particular user and how the rights information may be organized, and is not intended to be limiting. Other rights may be included, and other methods of organizing the rights information may be used.

Embodiments of a rights management system including rights caching component 210 may include one or more other components. For example, an implementation may include one or more stations or consoles from which an administrator or administrators may perform various administrative functions for the rights management within the CAD system, including but not limited to defining and modifying the rights, policies, and rules that are to be enforced.

Figure 3:
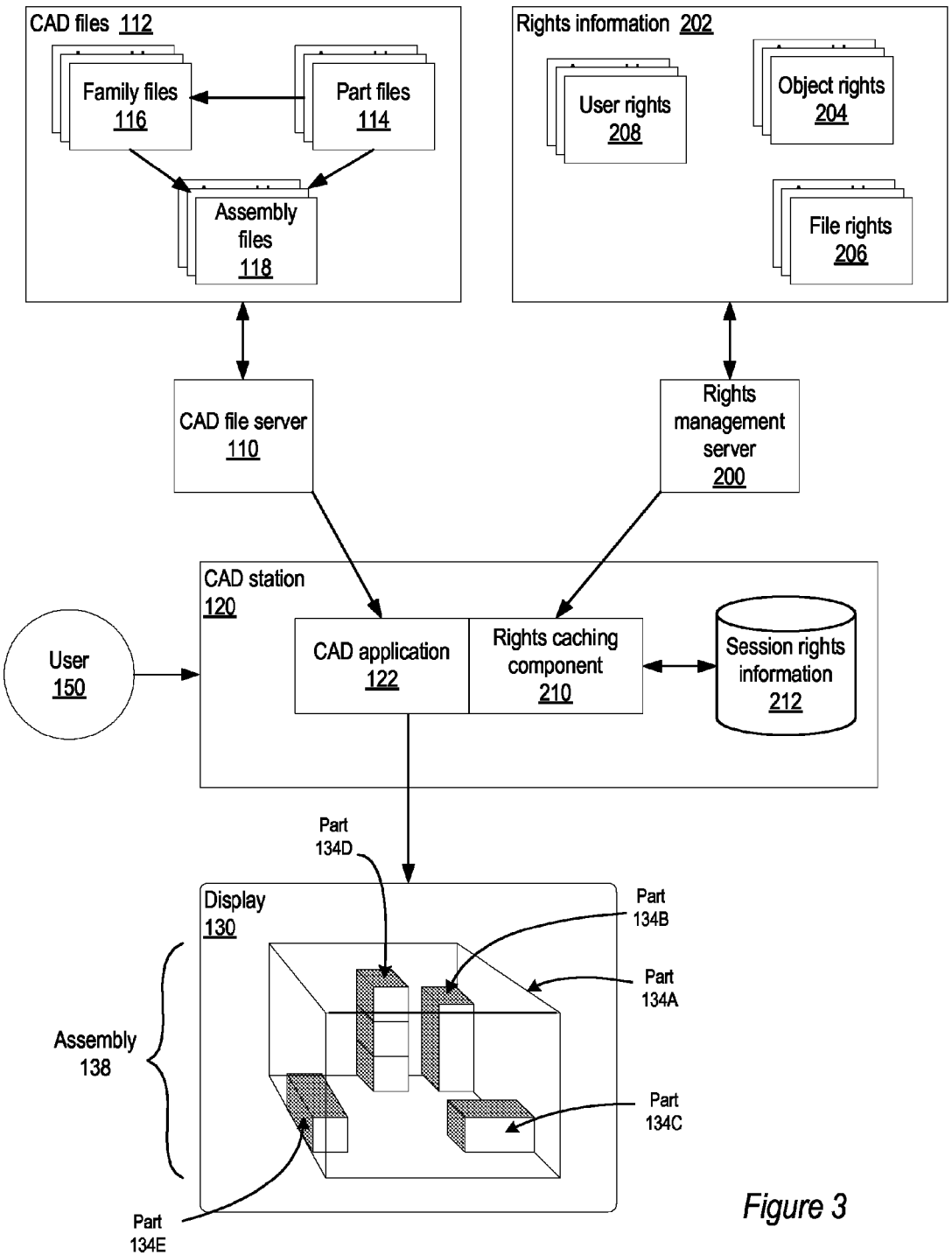
FIG. 3 illustrates the operation of a rights management system including a rights caching component implemented in a networked CAD system according to one embodiment.

FIG. 3 illustrates the operation of a rights management system including a rights caching component implemented in a networked CAD system according to one embodiment. CAD station 120 may host an instance of rights caching component 210. In one embodiment, rights caching component 210 may be implemented as a plug-in to CAD application 122 on CAD station 122. Alternatively, rights caching component 210 may be implemented as a module or component of CAD application 122, or as a stand-alone program.

A user 150 may interact with CAD application 122 implemented on CAD station 120 to initiate a CAD session, and within the CAD session may initiate various CAD operations. In one embodiment, at some point during or after the initiation of the CAD session, the local instance of rights caching component 210 may obtain or determine identifying information for the user 150 (e.g., a user name, user identifier, and/or user password). Rights caching component 210 may then communicate with rights management server 200 to obtain digital rights information for the user from rights information 202. The obtained digital rights information may, but does not necessarily, include all digital rights information for the user 150, and thus may, but does not necessarily, include all digital rights information that may be required during the CAD session. The obtained digital rights information may then be locally cached by rights caching component 210 as session rights information 212. In one embodiment, session rights information 212 may be encrypted or otherwise protected so that the session rights information 212 may be securely accessed by the rights caching component 210 while also being protected from intentional or unintentional access or modification by the user that initiated the session or by other individuals or software programs.

In one embodiment, obtaining digital rights information for user 150 may require only one message to be sent remotely over the network to rights management server 200. In other embodiments, more than one message may be sent by rights caching component 210 to rights management server 200 to obtain digital rights information for the user 150. In either case, the number of messages that are sent to rights management server 200 during a CAD session may be reduced, as after locally caching session rights information 212 for the user 150, operations during the CAD session that require digital rights may be locally satisfied by accessing the local cache of session rights information 212 rather than remotely accessing rights information 202 via rights management server 212. After locally caching session rights information 212 on a CAD station 120 for user 150, rights caching component 210 may locally manage digital rights for CAD objects (e.g., CAD assemblies, parts in a CAD assembly, etc.) during the CAD session using the locally cached session rights information 212.

During the CAD session, various operations for which rights management is to be applied may be initiated by the user 150 interacting with the CAD application 122 user interface. In one embodiment, the rights caching component 210 may intercept or otherwise access an initiated operation on the CAD station 120, and in response to the initiated operation act to apply the proper rights management in accordance with the digital rights of the particular user 150 associated with the CAD session locally cached in session rights information 212. In one embodiment, as an alternative to the rights caching component 210 intercepting or otherwise accessing initiated operations and then accessing session rights information 212 to determine the relevant rights for the operation, CAD application 122 may be configured to directly access the session rights information 212 to determine the relevant rights for the operation.

For example, the user 150 may interact with CAD application 122 to initiate an operation to open and display a particular CAD assembly 138. An assembly 138 may be considered a geometrically ordered or related collection of parts 134 that may be rendered and displayed on a CAD station 120 by a CAD application 122 from the information contained in an assembly file 118. The assembly file 118 may reference other CAD files 112, such as one or more part files 114 and/or one or more family files 116. The assembly file 118 may include information related to the geometric relationships among the parts 134 indicated therein, and possibly other information related to the assembly 138. Each part file 114 may include information, including but not limited to geometric information, related to a particular part 134. A family file 116 may be a file that indicates a collection of one or more part files 114, and may include other information such as information about relationships among the parts 138 indicated therein.

In response to user 150 initiating an operation to open and display assembly 138, CAD application 122 may be configured to communicate with CAD file server 110 to access the assembly file 118 for the desired assembly 138. In one embodiment, rights caching component 210 may intercept or otherwise access the operation in order to determine the rights of user 150 in regards to the assembly file 118. Rights caching component 210 may access session rights information 212 to determine if user 150 has the appropriate rights to access (open) the associated assembly file 118 and to thus display assembly 138 on CAD station 120. Similarly, rights caching component 210 may access session rights information 212 to determine if user 150 has the appropriate rights to access (open) the associated part file(s) 114 and/or family file(s) 116 to display the various parts 134 of assembly 138 on CAD station 120.

If the rights caching component 210 determines that user 150 has the appropriate rights to access the assembly file 118 and display the assembly 138, rights caching component 210 may allow CAD application 122 to access the assembly file 118 via the CAD file server 110 and render the assembly 138 on a display 130 coupled to the CAD station 120 using the part 134 information and geometric relationship information (binding information) included in the assembly file 118 and referenced part files 114. In this example, assembly 138 has been rendered on display 130 as a 3-D model that includes, in this view of the assembly 138, parts 134A through 134E ordered according to a geometric relationship as specified in the assembly file 118.

If the rights caching component 210 determines that user 150 does not have the appropriate rights to access the assembly file 118, the rights caching component 210 may prevent CAD application 122 from opening and displaying the assembly 138. If the rights caching component 210 determines that user 150 has the appropriate rights to access the assembly file 118 but not one or more of the part files 114 indicated by the assembly file 118, the rights caching component 210 may allow CAD application 122 to open and display the assembly 138 but not the one or more parts 134 thereof for which the user 150 does not have the appropriate rights.

Once assembly 138 is displayed on display 130, user 150 may then need or desire to manipulate, modify, or perform other types of operations on the assembly 138 or parts 134 via a user interface to CAD application 122 on CAD station 120. For example, the user 150 may need or desire to add or remove parts 134, move parts 134, modify parts 134, print the assembly 138 or portions thereof, rotate or otherwise change the perspective or view of the assembly 138, view other aspects of the assembly 138 not currently displayed, copy the assembly 138 or one or more parts of the assembly 138 to a storage medium, forward or copy the assembly 138 via the network to some remote destination, change characteristics or geometric relationships of the parts 134 of the assembly, and so on.

The user 150 may interact with CAD application 122 to initiate an operation on CAD assembly 138 or one or more parts 134 thereof. In response to user 150 initiating an operation, rights caching component 210 may intercept or otherwise access the operation in order to determine the rights of user 150 in regards to performing the particular operation. Rights caching component 210 may access session rights information 212 to determine if user 150 has the appropriate rights to perform the operation on the assembly 138 and/or part 134 level for the affected parts 134. If the rights caching component 210 determines that user 150 has the appropriate rights to perform the operation, rights caching component 210 may allow CAD application 122 to perform the operation. If the rights caching component 210 determines that user 150 does not have the appropriate rights to perform the operation, rights caching component 210 may prohibit CAD application 122 from performing the operation.

As an example, user 150 may initiate a print operation via CAD application 122 to print assembly 138 on a local or remote printer. Rights caching component 210 may access the local cache of session rights information 212 to determine if user 150 has print rights for assembly 138 and for each of the parts 134 of assembly 138. If user 150 has print rights for assembly 138 and for each of the parts 134 of assembly 138, CAD application 122 may be allowed to print assembly 138 (or the current view of the assembly 138) and the parts 134 of assembly 138. In one embodiment, if user 150 has print rights for assembly 138 and for each of the parts 134 of assembly 138 except, for example, part 134B, CAD application 122 may be allowed to print assembly 138 (or the current view of the assembly 138) and all of the parts 134 of assembly 138 except part 134B.

As another example, user 150 may initiate a copy operation via CAD application 122 to copy assembly 138 to a local storage medium or via a network to a remote destination. Rights caching component 210 may access the local cache of session rights information 212 to determine if user 150 has the appropriate rights to make a local or remote copy of assembly 138 and each of the parts 134 of assembly 138. In one embodiment, if user 150 has the appropriate rights to copy assembly 138 and each of the parts 134 of assembly 138, CAD application 122 may be allowed to copy assembly 138 and the parts 134 of assembly 138 to the indicated local or remote destination. If user 150 has the appropriate rights to copy assembly 138 and each of the parts 134 of assembly 138 except part 134B, CAD application 122 may be allowed to copy assembly 138 and the parts 134 of assembly 138 to the indicated local or remote destination with the exception of part 134B.

In some cases, rights caching component 210 may determine that rights information for an object or objects in a CAD assembly 138 that are required in response to the initiation of an operation by user 150 are not locally cached in session rights information 212. In some cases, rights caching component 210 may determine that the user's rights in regards to at least some object or objects in a CAD assembly do not allow the user 150 offline access of the object(s), and thus the local cache of session rights information 212 cannot be used to determine the user's rights in regards to the object(s). In these cases, and possibly in other cases, rights caching component 210 may attempt to communicate with rights management server 200 to obtain the needed rights information. If successful, the obtained rights may then be used to apply proper rights management for the operation to the associated objects. The obtained rights information may be added to or updated in the local cache in session rights information 212.

In one embodiment, during a CAD session, rights caching component 210 may periodically or aperiodically synchronize session rights information 212 with rights information 202 via rights management server 200 to insure that the user's locally cached digital rights are current. In one embodiment, the synchronization may be event-driven. For example, some operations, such as opening a CAD assembly 138, closing or saving a CAD assembly 138, or printing a CAD assembly 138 may initiate a synchronization of session rights information 212 with rights information 202. In one embodiment, CAD application 122 may include one or more user interface elements, such as a menu selection or button on a toolbar or other user interface, that allow the user 150 to initiate a synchronization of session rights information 212 with rights information 202 as necessary or desired.

Figure 4:
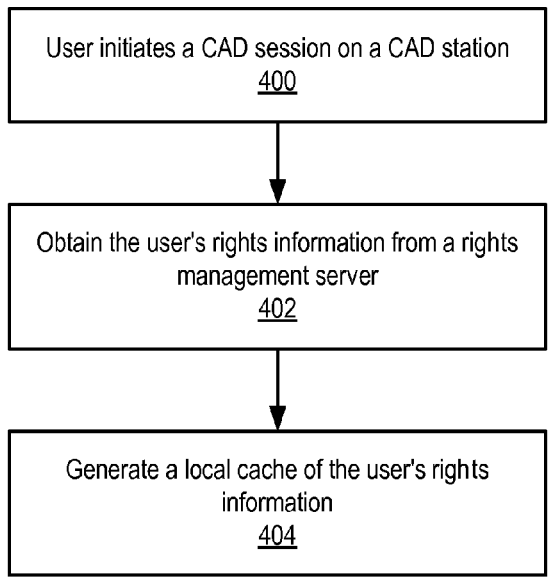
FIGS. 4 and 5 are flowcharts illustrating a method of operation of instances of a rights caching component in a CAD system according to one embodiment.
Figure 5:
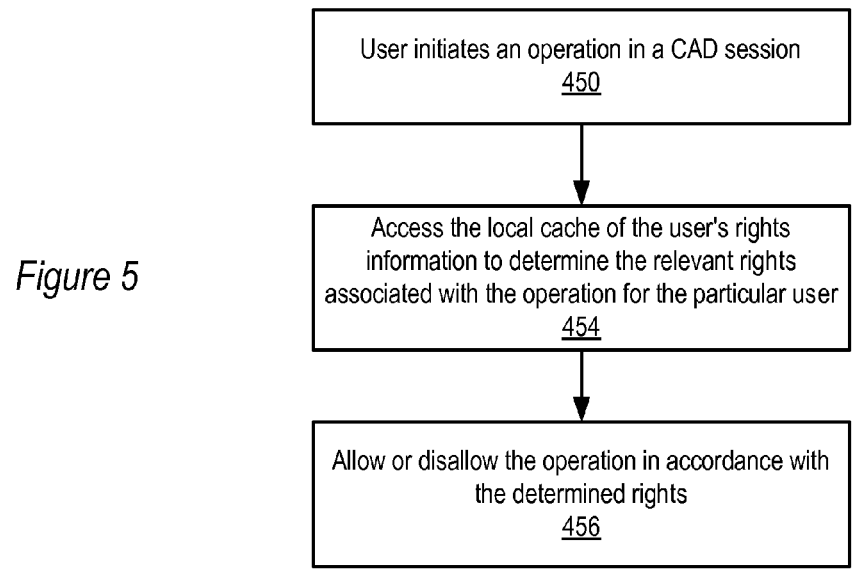

FIGS. 4 and 5 are flowcharts illustrating a method of operation of instances of a rights caching component in a CAD system according to one embodiment. FIG. 4 illustrates the generation of a local cache of user rights information according to one embodiment. As indicated at 400, a user may initiate a CAD session on a CAD station. As indicated at 402, the user's digital rights information may be obtained from a rights management server. In one embodiment, obtaining digital rights information for the user for the CAD session may require only one message to be sent remotely over a network to the rights management server. In other embodiments, more than one message may be sent to the rights management server to obtain the digital rights information for the user.

As indicated at 404, a local cache of the obtained digital rights information for the user may be generated. In one embodiment, the local cache may be created from the obtained digital rights information. Alternatively, digital rights information for the user may already be locally cached, and obtaining the digital rights information and generating the local cache may involve synchronizing the existing local cache of rights information for the user with the digital rights information stored and managed by the rights management server. In one embodiment, the local cache of digital rights information may be encrypted or otherwise protected.

In one embodiment, the local cache of digital rights information may be periodically or aperiodically synchronized with the digital rights managed by the rights management server. In one embodiment, synchronization may be event-driven; for example, events such as opening, closing or saving a CAD assembly may initiate a synchronization. In one embodiment, synchronization may be manually initiated by the user via a user interface to the CAD application software on the CAD station as necessary or desired.

FIG. 5 illustrates the application of digital rights from a local cache to various operations in a CAD session according to one embodiment. As indicated at 450, a user may initiate an operation in a CAD session. For example, the user may attempt to open a CAD assembly, or to perform some operation on one or more parts of an opened CAD assembly. As indicated at 454, the local cache of the user's right information may be accessed to determine the relevant rights associated with the operation for the particular user. As indicated at 456, the operation may be allowed or disallowed in accordance with the rights of the particular user for the operation and the CAD objects affected as determined from the local cache of the user's rights information.

In one embodiment, to apply digital rights to operations in a CAD session, a rights caching component may intercept or otherwise access an initiated operation on the CAD station, and in response to the initiated operation act to apply the proper rights management in accordance with the digital rights of the particular user associated with the CAD session that are locally cached as session rights information. In one embodiment, as an alternative to the rights caching component intercepting or otherwise accessing initiated operations and then accessing the local cache of session rights information to determine the relevant rights for the operation, the CAD application may be configured to directly access the session rights information to determine the relevant rights for the operation.

In some cases, it may be determined that some or all of the necessary rights information for an operation initiated by the user are not locally cached, or that the user is not permitted to access some CAD objects offline. In these cases, the rights management server may be remotely accessed to obtain the needed rights information for the operation.

Exemplary System

Figure 6:
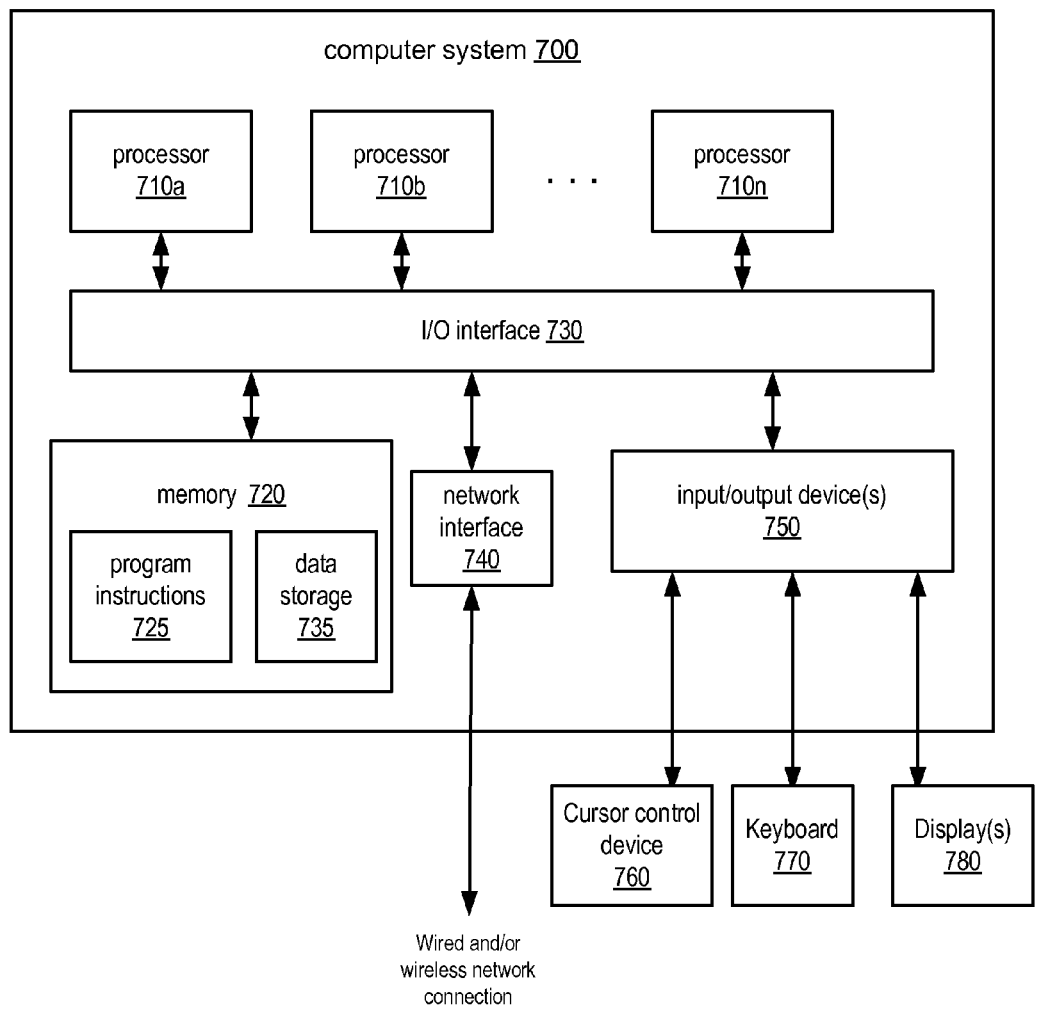
FIG. 6 illustrates an exemplary computer system that may be used in embodiments.

Various components of embodiments, including but not limited to instances of a rights caching component as described herein, may be executed on one or more computer systems, which may interact with various other devices. One such computer system is illustrated by FIG. 6. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for instances of the rights caching component and local caches of session rights information, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 6, memory 720 may include program instructions 725, configured to implement embodiments of the rights caching component as described herein, and data storage 735, comprising various data accessible by program instructions 725, such as session rights information as described herein. In one embodiment, program instructions 725 may include software elements of a rights caching component 210 as illustrated in FIGS. 1, 2 and 3. Data storage 735 may include data that may be used in embodiments, such as session rights information 212 illustrated in FIGS. 1, 2 and 3. In other embodiments, other or different software elements and data may be included.

Those skilled in the art will appreciate that computer system 700 is merely illustrative and is not intended to limit the scope of the rights caching component as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   initiating a session on a workstation in response to user input, wherein the session is associated with a particular user of the network computing environment;
   generating or synchronizing a local cache of rights information on the workstation in a network computing environment, wherein the local cache of rights information includes a subset of network computing environment rights information managed by a server in the network computing environment for applying digital rights management to a collection of data objects in a data store in the network computing environment, wherein said generating or synchronizing comprises obtaining at least some of the network computing environment rights information from the server and wherein said generating or synchronizing is performed in response to said initiating the session;

during the session, receiving an operation initiated on the workstation, the operation involving multiple ones of the collection of data objects, each having separate rights information;

obtaining rights information corresponding to each of the multiple ones of the collection of data objects of the operation initiated on the workstation from the local cache of rights information on the workstation even when the server is available; and allowing or disallowing the initiated operation to be performed for one or more of the data objects in accordance with the rights information obtained from the local cache.

2. The computer-implemented method as recited in claim 1, wherein said generating a local cache of rights information on a workstation in a network computing environment comprises:

obtaining the subset of network computing environment rights information from the server in response to said initiating the session; and creating the local cache of rights information from the obtained subset of network computing environment rights information.

3. The computer-implemented method as recited in claim 1, wherein said generating a local cache of rights information on a workstation in a network computing environment comprises synchronizing a previously created local cache of rights information with the network computing environment rights information managed by the server.

4. The computer-implemented method as recited in claim 1, wherein the subset of network computing environment rights information in the local cache of rights information is specific to the particular user associated with the session.

5. The computer-implemented method as recited in claim 1, wherein the subset of network computing environment rights information in the local cache of rights information is specific to a particular user of the network computing environment associated with the workstation.

6. The computer-implemented method as recited in claim 5, wherein said allowing or disallowing the initiated operation to be performed for one or more of the data objects is determined in accordance with the rights information specific to the particular user in regards to the initiated operation and the one or more data objects.

7. The computer-implemented method as recited in claim 1, wherein said generating a local cache of rights information on a workstation in a network computing environment comprises:

transmitting a request message via the network to the server in the network computing environment that manages the network computing environment rights information;

receiving the subset of network computing environment rights information from the server in one or more response messages; and storing the subset of network computing environment rights information in the local cache of rights information.

8. The computer-implemented method as recited in claim 1, further comprising encrypting the local cache of rights information to prevent unauthorized accesses of the rights information.

9. The computer-implemented method as recited in claim 1, further comprising periodically or aperiodically synchronizing the local cache of rights information with the network computing environment rights information managed by the server.

10. The computer-implemented method as recited in claim 1, further comprising synchronizing the local cache of rights information with the network computing environment rights information managed by the server in response to an event on the workstation.

11. The computer-implemented method as recited in claim 10, wherein the event is one of opening, closing and saving one or more of the data objects in the data store.

12. The computer-implemented method as recited in claim 1, further comprising disconnecting the workstation from the network computing environment, wherein said obtaining rights information corresponding to an operation initiated on the workstation from the local cache of rights information on the workstation and said allowing or disallowing the initiated operation to be performed in accordance with the rights information obtained from the local cache occur offline after said disconnecting the workstation from the network computing environment.

13. The computer-implemented method as recited in claim 1, wherein said network computing environment is a network-based Computer-Aided Design (CAD) system, wherein said collection of data objects in the data store are CAD files associated with CAD assemblies and CAD parts.

14. The computer-implemented method as recited in claim 13, wherein said workstation is a CAD station, wherein said operation is a CAD operation initiated by an instance of a CAD application on the CAD station.

15. A Computer-Aided Design (CAD) station, comprising:
at least one processor; and
a memory comprising program instructions, wherein the program instructions are executable by the at least one processor to:

initiate a CAD session on the CAD station in response to user input, wherein the CAD session is associated with a particular user of the network computing environment;

generate or synchronize a local cache of rights information for the CAD session initiated on the CAD station, wherein the local cache of rights information is specific to a particular user associated with the CAD session, and wherein the local cache of rights information comprises a subset of rights information stored and managed by a rights management server in a network CAD system for applying digital rights management to a collection of data objects in a data store in the network CAD system, wherein said generating or synchronizing comprises obtaining at least some of the rights information from the rights management server and wherein said generating or synchronizing is performed in response to said initiating the CAD session;

during the CAD session, receive an operation initiated on the CAD station, the operation involving multiple ones of the collection of data objects, each having separate rights information; and access the local cache of rights information corresponding to each one of the multiple ones of the collection of data objects to determine rights of the particular user to perform particular operations initiated on the CAD station during the CAD session even when the server is available.

16. The CAD station as recited in claim 15, wherein the rights management server is configured to store and manage rights information associated with CAD files stored and managed by a CAD file server, wherein the CAD files include CAD part files and CAD assembly files.

17. The CAD station as recited in claim 15, wherein, to generate a local cache of rights information for a CAD session initiated on the CAD station, the program instructions are executable by the at least one processor to:
   obtain the subset of rights information from the rights management server in response to initiation of the CAD session; and
   synchronize a previously created local cache of rights information with the obtained subset of rights information.

18. The CAD station as recited in claim 15, wherein, to generate a local cache of rights information for a CAD session initiated on the CAD station, the program instructions are executable by the at least one processor to:
   transmit a request message via a network to the rights management server, wherein the request message specifies the particular user;
   receive the subset of rights information from the rights management server in one or more response messages; and
   store the subset of rights information in the local cache of rights information.

19. The CAD station as recited in claim 15, wherein the program instructions are further executable by the at least one processor to encrypt the local cache of rights information to prevent unauthorized accesses of the rights information.

20. The CAD station as recited in claim 15, wherein the program instructions are further executable by the at least one processor to periodically or aperiodically synchronize the local cache of rights information with the rights information managed by the rights management server.

21. The CAD station as recited in claim 15, wherein the program instructions are further executable by the at least one processor to synchronize the local cache of rights information with the rights information managed by the rights management server in response to an event generated during the CAD session on the CAD station.

22. The CAD station as recited in claim 21, wherein the event is one of opening, closing and saving one or more CAD files stored and managed by a CAD file server, wherein the CAD files include CAD part files and CAD assembly files.

23. The CAD station as recited in claim 15, wherein the CAD station is configured to be disconnected from the rights management server, and wherein the program instructions are further executable by the at least one processor to access the local cache of rights information to determine rights of the particular user to perform particular operations initiated on the CAD station during the CAD session while the CAD station is disconnected from the rights management server.

24. A non-transitory computer-readable storage medium comprising program instructions, wherein the program instructions are computer-executable to implement:
   initiating a session on a workstation in response to user input, wherein the session is associated with a particular user of the network computing environment;
   generating or synchronizing a local cache of rights information on the workstation in a network computing environment, wherein the local cache of rights information includes a subset of network computing environment rights information managed by a server in the network computing environment for applying digital rights management to a collection of data objects in a data store in the network computing environment, wherein said generating or synchronizing comprises obtaining at least some of the network computing environment rights information from the server and wherein said generating or synchronizing is performed in response to said initiating the session;
   during the session, receiving an operation initiated on the workstation, the operation involving multiple ones of the collection of data objects, each having separate rights information;
   obtaining rights information corresponding to each of the multiple ones of the collection of data objects of the operation initiated on the workstation from the local cache of rights information on the workstation even when the server is available; and
   allowing or disallowing the initiated operation to be performed for one or more of the data objects in accordance with the rights information obtained from the local cache.

25. The computer-readable storage medium as recited in claim 24, wherein, in said generating a local cache of rights information on a workstation in a network computing environment, the program instructions are computer-executable to implement:
   obtaining the subset of network computing environment rights information from the server in response to said initiating the session; and
   creating the local cache of rights information from the obtained subset of network computing environment rights information.

26. The computer-readable storage medium as recited in claim 24, wherein, in said generating a local cache of rights information on a workstation in a network computing environment, the program instructions are computer-executable to implement synchronizing a previously created local cache of rights information with the network computing environment rights information managed by the server.

27. The computer-readable storage medium as recited in claim 24, wherein the subset of network computing environment rights information in the local cache of rights information is specific to the particular user associated with the session.

28. The computer-readable storage medium as recited in claim 24, wherein the subset of network computing environment rights information in the local cache of rights information is specific to a particular user of the network computing environment associated with the workstation.

29. The computer-readable storage medium as recited in claim 28, wherein said allowing or disallowing the initiated operation to be performed for one or more of the data objects is determined in accordance with the rights information specific to the particular user in regards to the initiated operation and the one or more data objects.

30. The computer-readable storage medium as recited in claim 24, wherein, in said generating a local cache of rights information on a workstation in a network computing environment, the program instructions are computer-executable to implement:
   transmitting a request message via the network to the server in the network computing environment that manages the network computing environment rights information;

receiving the subset of network computing environment rights information from the server in one or more response messages; and storing the subset of network computing environment rights information in the local cache of rights information.

31. The computer-readable storage medium as recited in claim 24, wherein the program instructions are computer-executable to implement encrypting the local cache of rights information to prevent unauthorized accesses of the rights information.

32. The computer-readable storage medium as recited in claim 24, wherein the program instructions are computer-executable to implement periodically or aperiodically synchronizing the local cache of rights information with the network computing environment rights information managed by the server.

33. The computer-readable storage medium as recited in claim 24, wherein the program instructions are computer-executable to implement synchronizing the local cache of rights information with the network computing environment rights information managed by the server in response to an event on the workstation.

34. The computer-readable storage medium as recited in claim 33, wherein the event is one of opening, closing and saving one or more of the data objects in the data store.

35. The computer-readable storage medium as recited in claim 24, wherein the program instructions are computer-executable to implement performing said obtaining rights information corresponding to an operation initiated on the workstation from the local cache of rights information on the workstation and said allowing or disallowing the initiated operation to be performed in accordance with the rights information obtained from the local cache occur while the workstation is disconnected from the network computing environment.

36. The computer-readable storage medium as recited in claim 24, wherein said network computing environment is a network-based Computer-Aided Design (CAD) system, wherein said collection of data objects in the data store are CAD files associated with CAD assemblies and CAD parts.

37. The computer-readable storage medium as recited in claim 36, wherein said workstation is a CAD station, wherein said operation is a CAD operation initiated by an instance of a CAD application on the CAD station.

38. A Computer-Aided Design (CAD) system, comprising:

a CAD file server configured to store CAD files including part files and assembly files;

a rights management server configured to store rights information associated with the CAD files on the CAD file server; and one or more CAD stations each comprising:
    an instance of a CAD application; and
    an instance of a rights caching component;

wherein each rights caching component is configured to:
    generate or synchronize a local cache of rights information for a particular CAD session on one or more of the CAD stations, wherein the local cache of rights information is specific to a particular user associated with the particular CAD session and wherein the local cache of rights information is generated or synchronized in response to user input initiating the particular CAD session, wherein the local cache comprises a subset of rights information stored and managed by the rights management server in the CAD system for applying digital rights management to the part files and assembly files in the CAD file server, wherein to generate or synchronize the local cache of rights information, the rights caching component is configured to obtain at least some of the rights information from the rights management server;

during the particular CAD session, receive an operation initiated on the corresponding one or more CAD station, the operation involving multiple ones of parts files or assembly files, each having separate rights information; and access the local caches of rights information corresponding to each one of the multiples ones of parts files or assembly files to determine rights of the particular user to perform particular operations initiated on the one or more CAD stations by the particular user during the particular CAD session even when the server is available.

* * * * *